United States Patent
Nakamura et al.

(10) Patent No.: US 10,259,709 B2
(45) Date of Patent: Apr. 16, 2019

(54) STEAM REFORMING CATALYST FOR HYDROCARBON-CONTAINING GAS, APPARATUS FOR PRODUCING HYDROGEN, AND METHOD FOR PRODUCING HYDROGEN

(71) Applicants: CLARIANT PRODUKTE (DEUTSCHLAND) GMBH, Frankfurt am Main (DE); CLARIANT CATALYSTS (JAPAN) K.K., Tokyo (JP)

(72) Inventors: Hiroshi Nakamura, Toyama (JP); Hirohiko Itami, Toyama (JP); Junko Ida, Tokyo (JP); Markus Reichinger, Munich (DE)

(73) Assignees: CLARIANT PRODUKTE (DEUTSCHLAND) GMBH, Frankfurt am Main (DE); CLARIANT CATALYSTS (JAPAN) K.K., Tokyo (JP)

( * ) Notice: Subject to any disclaimer, the term of this patent is extended or adjusted under 35 U.S.C. 154(b) by 0 days.

(21) Appl. No.: 15/529,862

(22) PCT Filed: Oct. 14, 2015

(86) PCT No.: PCT/JP2015/005200
§ 371 (c)(1),
(2) Date: May 25, 2017

(87) PCT Pub. No.: WO2016/088290
PCT Pub. Date: Jun. 9, 2016

(65) Prior Publication Data
US 2017/0267523 A1    Sep. 21, 2017

(30) Foreign Application Priority Data
Dec. 1, 2014 (JP) .................... 2014-243004

(51) Int. Cl.
*C01B 3/40* (2006.01)
*B01J 23/10* (2006.01)
(Continued)

(52) U.S. Cl.
CPC ................. *C01B 3/40* (2013.01); *B01J 23/10* (2013.01); *B01J 23/42* (2013.01); *B01J 23/46* (2013.01);
(Continued)

(58) Field of Classification Search
CPC .... C01B 3/40; B01J 23/10; B01J 23/42; B01J 23/46
See application file for complete search history.

(56) References Cited

U.S. PATENT DOCUMENTS 7,767,619 B2    8/2010  Zhao et al.
2001/0014304 A1*  8/2001  Satokawa ............. B01D 53/02
                                          423/244.11
(Continued)

FOREIGN PATENT DOCUMENTS

JP    2002-066313 A    3/2002
JP    2002-179406 A    6/2002
(Continued)

OTHER PUBLICATIONS

Hachimi, O. et al. (2007) Journal of Alloys and Compounds, 427, 104-109.*
(Continued)

Primary Examiner — Brian A McCaig
(74) Attorney, Agent, or Firm — Scott R. Cox

(57) ABSTRACT

Problem to be Solved
A catalyst for obtaining hydrogen gas by steam reforming of a hydrocarbon-containing gas in the presence of steam including active metals supported on an α-alumina carrier. The active metals include 0.1 to 0.3 parts by weight of rhodium (Rh) based on the content of the metal, relative to (Continued)

100 parts by weight of the α-alumina carrier, and 0.01 to 0.3 parts by weight of platinum (Pt) based on the content of the metal, relative to 100 parts by weight of the α-alumina carrier.

The α-alumina carrier is modified with a promoter including 1 to 10 parts by weight of cerium (Ce) based on the content of the metal, relative to 100 parts by weight of the α-alumina carrier.

21 Claims, 5 Drawing Sheets

(51) Int. Cl.
 B01J 23/42 (2006.01)
 B01J 23/46 (2006.01)
 B01J 23/63 (2006.01)
 H01M 8/06 (2016.01)

(52) U.S. Cl.
 CPC ............... *B01J 23/63* (2013.01); *H01M 8/06* (2013.01); *C01B 2203/0233* (2013.01); *C01B 2203/1047* (2013.01); *C01B 2203/1064* (2013.01); *Y02P 20/52* (2015.11)

(56) References Cited

U.S. PATENT DOCUMENTS

| | | |
|---|---|---|
| 2003/0129123 A1 | 7/2003 | Ramani et al. |
| 2008/0237542 A1 | 10/2008 | Schmidt et al. |
| 2009/0108238 A1 | 4/2009 | Wagner et al. |
| 2014/0005042 A1* | 1/2014 | Feaviour ............... B01J 23/52 502/304 |
| 2016/0008790 A1* | 1/2016 | Takami ............... B01J 23/46 252/373 |

FOREIGN PATENT DOCUMENTS

| | | | | |
|---|---|---|---|---|
| JP | 2008-161873 A | 7/2008 | | |
| JP | 2009-148688 A | 7/2009 | | |
| JP | 2011-088066 A | 5/2011 | | |
| JP | 2011-206726 A | 10/2011 | | |
| JP | 2013-103149 A | 5/2013 | | |
| JP | 2013-202568 A | 10/2013 | | |
| WO | WO 2008-0016232 A1 | 1/2008 | | |
| WO | WO 2012/110781 A1 * | 8/2012 | ............. | B01J 23/42 |
| WO | WO2012110781 A1 | 8/2012 | | |
| WO | WO 2014/136279 A1 * | 9/2014 | ............. | B01J 23/46 |

OTHER PUBLICATIONS

International Search Report dated Nov. 17, 2015 with respect to international application No. PCT/JP2015/005200.

Extend European Search Report dated Jun. 27, 2018 with respect to international application No. PCT/JP2015/005200.

English Translation of Japanese Official Report dated Nov. 30, 2018 with respect to Japanese Application No. 2017-243004.

* cited by examiner

FIGURE 1    CONVERSION VS. Pt RATIO
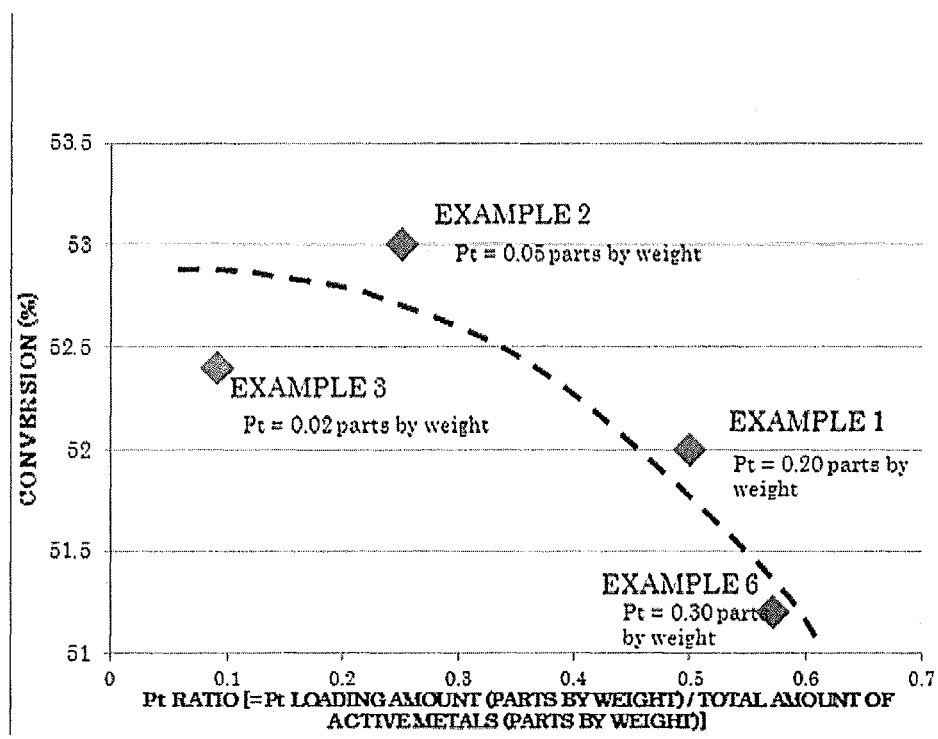

FIGURE 2 CONVERSION VS. Rh LOADING AMOUNT (PARTS BY WEIGHT)
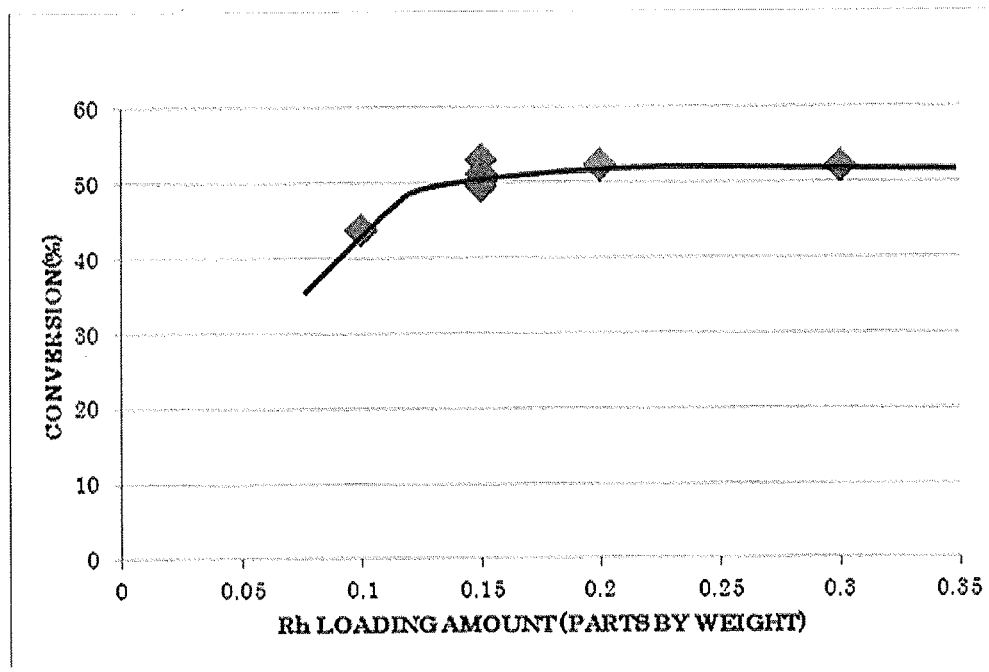

FIGURE 3  CONVERSION VS. Ce LOADING AMOUNT (PARTS BY WEIGHT)
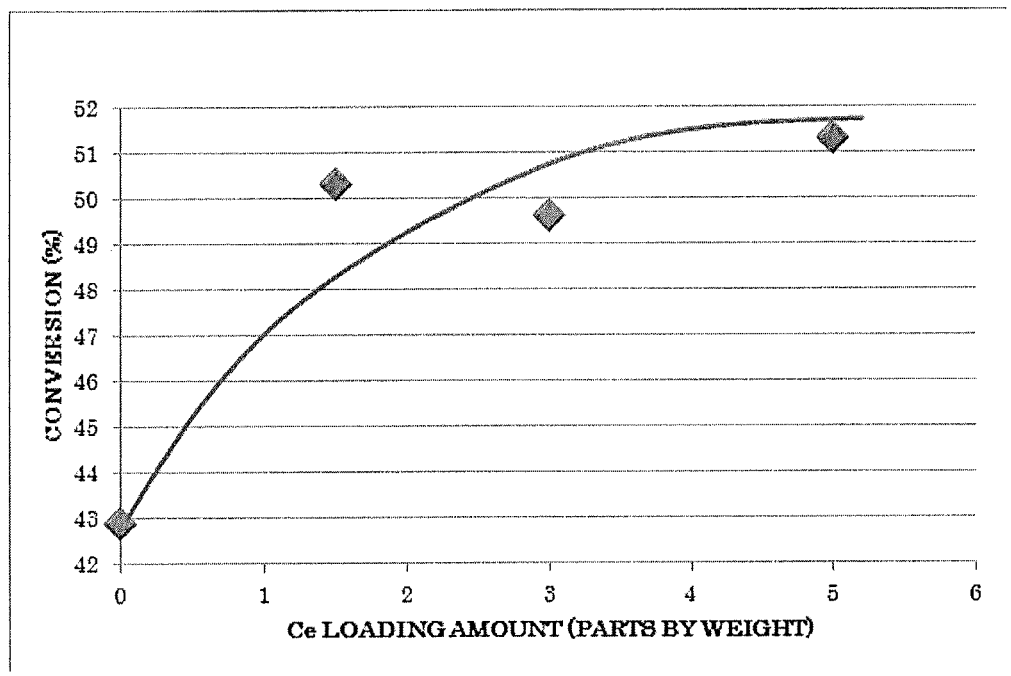

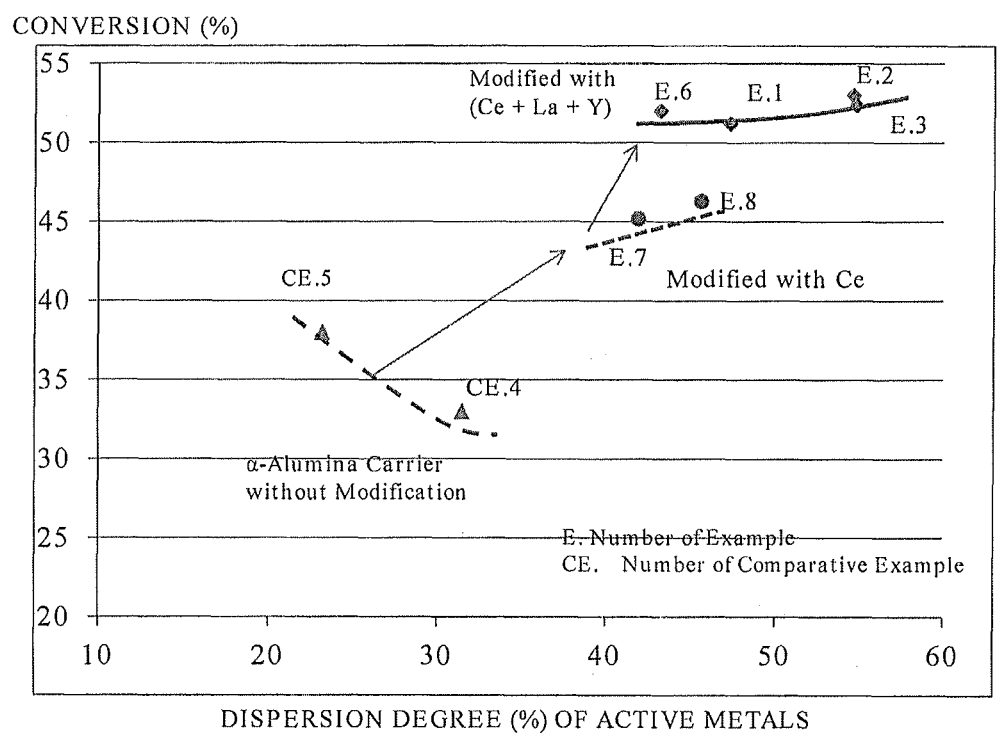
FIGURE 4 DISPERSION DEGREE VS. CONVERSION

FIGURE 5  RESULTS OF STABILITY EVALUATION
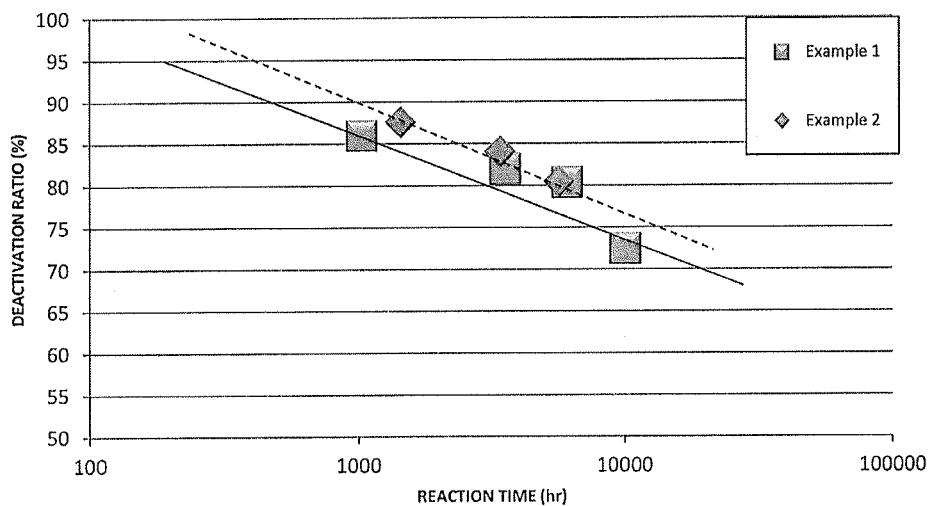
FIGURE 6  XRD PATTERN
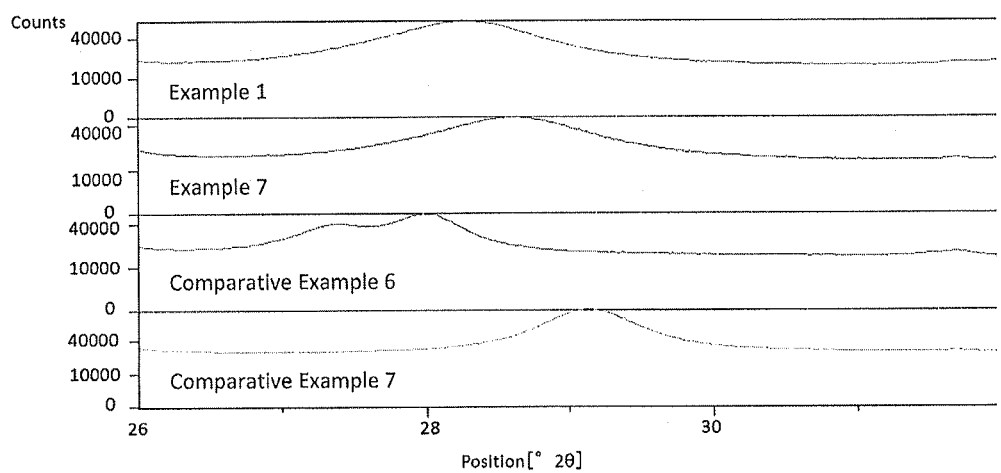

STEAM REFORMING CATALYST FOR HYDROCARBON-CONTAINING GAS, APPARATUS FOR PRODUCING HYDROGEN, AND METHOD FOR PRODUCING HYDROGEN

TECHNICAL FIELD

The present invention relates to a steam reforming catalyst for reacting a hydrocarbon-containing gas to be converted into a hydrogen-containing reformed gas by means of steam reforming. In particular, the present invention relates to a steam reforming catalyst suitable for a hydrocarbon gas desulfurized through a desulfurization apparatus, preferably a super higher-order desulfurization apparatus or an ordinary temperature desulfurization apparatus, wherein the catalyst demonstrates a sufficient conversion ratio, and even if a feed gas containing a sulfur compound or nitrogen is used, when it is combined with an appropriate desulfurization treatment, the catalyst has a high stability and can maintain high activity even after being reacted for a long time, and can also inhibit the generation of ammonia, and the catalyst further allows a reduction in catalyst production costs. The present invention also relates to an apparatus for producing hydrogen and a method for producing hydrogen, using the above-described catalyst.

BACKGROUND ART

In recent years, along with increasing awareness of environmental issues, attention has been focused on fuel cells as one of the clean energy technologies. A fuel cell is an energy technology that utilizes hydrogen, and can convert hydrogen and oxygen into electrical energy through an electrochemical reaction between them, without causing any direct emission of carbon dioxide, which is one of the causes of global warming. Various feedstocks have been considered as hydrogen sources for fuel cells, such as natural gas, liquid fuels, petroleum-based hydrocarbons, and biomass-derived feedstocks.

To produce hydrogen from hydrocarbon-containing feedstocks as described above, a method in which the steam reforming reaction for reacting steam and a hydrocarbon gas is performed using a steam reforming catalyst is generally employed. The chemical reaction for generating hydrogen by means of steam reforming of a hydrocarbon, for example, methane, is represented by formula (1):

$$CH_4 + H_2O \rightarrow 3H_2 + CO \quad (1)$$

In this reaction, if the ratio of steam to hydrocarbon gas during the steam reforming decreases, carbon will be deposited on the catalyst, causing the catalytic activity to decrease. Conversely, if the ratio of steam is high, the consumption of thermal energy for heating the steam will be high, which is disadvantageous in terms of cost. Thus, a reforming catalyst that has less carbon deposition even at a low steam ratio is required.

Hydrocarbon feedstock typically contains a sulfur compound. Such a sulfur compound may be naturally present, or can be artificially added as an odorant from a safety standpoint; in either case, however, the sulfur compound is adsorbed on a catalytic active metal, which causes the catalytic activity to decrease.

Furthermore, when, for example, natural gas, which is widespread as town gas, is used as a hydrocarbon gas feedstock, ammonia is likely to be generated from approximately several % of nitrogen contained therein, and the generated ammonia readily causes poisoning of downstream fuel cell electrodes. Thus, a steam reforming catalyst system that is unlikely to be affected even when a sulfur compound-containing hydrocarbon gas is used is required, and a steam reforming catalyst is also strongly required which does not cause the generation of ammonia, even if nitrogen gas is present in the hydrocarbon gas.

Thus, the important goals for the required performance in a steam reforming catalyst and a system using the catalyst are as follows: 1) high conversion ratio; 2) minimal adverse effect of the sulfur component, nitrogen gas or the like in the feedstock; 3) less carbon deposition during the reaction; and 4) less degradation in performance even after a long reaction time. In addition to these kinds of performance, 5) low catalyst production costs is an essential requirement for the widespread use of hydrogen energy. Conventionally, an expensive platinum-group element has been typically used as an active metal of such a steam reforming catalyst, and the proportion of the active metal in catalyst production costs is large; therefore, reducing the loading amount of the active metal is an extremely important issue for saving costs.

Among the above issues, with regard to 4) the long-term stability, no general target value is known as the time required varies depending on the use or usage conditions. In the case of a fuel cell for commercial use, however, the fuel cell is usually continuously operated throughout the night; thus, a catalyst lifetime of at least 1 year is required, and generally, a long-term stability of 10 years (approximately 90,000 hours when converted to hours) or longer is desired.

In view of these issues, catalysts in which Ru (ruthenium), a notably inexpensive noble metal which also has a high reactivity, is supported on a carrier such as alumina, for example, have been widely studied (Patent Literature 1). Ru, however, is likely to cause the generation of ammonia due to nitrogen contained in natural gas or the like. The major issue with ammonia is that it poisons the electrode catalyst in a fuel cell, which causes the system reliability to decrease.

There is a method that uses Ni (nickel) as a metal that can inhibit the generation of ammonia, and allows a reduction in costs; however, this also has a major problem in that it causes the generation of carbon (coke) during the steam reforming reaction. To remedy this problem, a catalyst has been proposed in which a combination of Ni with a minute amount of Pt (platinum) is carried on an alumina carrier having a rare-earth element and an alkaline earth metal supported thereon (Patent Literature 2). While this method can inhibit the generation of ammonia, there is a problem in that, because Ni is used as a main component, the deposition of coke cannot be completely prevented, and the activity will decrease if the reaction is continued for 1,000 hours or longer.

On the other hand, a system that uses rhodium (Rh) instead of Ru or Ni is known, and this system is considered to be preferable due to its high activity. There is, however, a problem in using Rh as an active metal in that ammonia is generated when a nitrogen-containing feed gas is used. Thus, a catalyst in which an alloy of Rh and Pt is directly supported on an α-alumina carrier having a purity of 99.99% or more has been proposed to be preferable in terms of preventing the generation of ammonia (Patent Literature 3). The catalyst of Patent Literature 3, however, has, low activity as will be shown in Comparative Example 5 below (corresponding to the catalyst disclosed in Patent Literature 3); moreover, although the catalyst can suppress the generation of ammonia, when a sulfur compound-containing hydrocarbon gas is used, the activity of the catalyst decreases due to sulfur poisoning of the catalyst. This is believed to occur because Pt readily adsorbs sulfur. That is, in conventional Rh-based catalysts, the use of Rh alone causes the generation of ammonia; however, the addition of Pt to prevent this has the problem of a trade-off relationship in that the activity tends to decrease due to sulfur poisoning.

A catalyst has been proposed in which a Rh-based metal is supported on an α-alumina carrier modified with cerium (Ce) and an alkaline earth metal, as a catalyst that can solve the aforementioned problem in the Rh system, and can be used without a desulfurization step (Patent Literature 4). In the Examples of Patent Literature 4, a system containing Rh as a single component as the active metal is shown (Example 1, for example), using LP gas containing 5 ppm of sulfur compound. This system, however, is not preferable in terms of ammonia generation, although it is resistant to sulfur poisoning. Example 3 of Patent Literature 4 also illustrates an alloy system having a loading amount of 1.5% of Rh and a loading amount of 0.5 wt % of Pt, relative to the weight of the carrier. Such a high Rh loading amount, however, is not practical for putting hydrogen fuel into widespread use, because, even if it is effective in reducing the influence of sulfur poisoning, it increases the production costs markedly.

On the other hand, a method is known in which steam reforming is performed after desulfurization with a desulfurizer placed upstream from the reformer, thereby preventing poisoning of the reforming catalyst. In such modes of desulfurization, an ordinary temperature desulfurizer using an adsorbent such as a silver zeolite, which can decrease sulfur to several ppb or less (Patent Literature 5), and a super higher-order desulfurizer using a Cu—Zn-based material (Patent Literature 6), are known. The placement of such a desulfurizer, however, increases the costs of the system as a whole, and thus, is difficult to put into practical use, unless the increase can be compensated for by decreasing the costs in the reforming catalyst's part. That is, the use of a desulfurizer in combination requires a stricter cost reduction in the reforming catalyst, and no steam reforming catalyst is known which is unlikely to be affected by the sulfur component, at such a low cost that it can meet that expectation.

As stated above, a catalyst for steam reforming of hydrocarbons has not been heretofore obtained which gives a high conversion ratio, is minimally affected by a sulfur compound, nitrogen gas or the like contained in a hydrocarbon feedstock, has less carbon deposition during the reaction, and exhibits practically stable performance even over a long time, i.e. 10 years (approximately 90,000 hours when converted to hours) or longer. Furthermore, even in combination with a desulfurizer, a catalyst that is low enough in price to put into general widespread use cannot be provided under the actual circumstances.

CITATION LIST

Patent Literature

Patent Literature 1: JP 2009-148688 A
Patent Literature 2: JP 2011-206726 A
Patent Literature 3: JP 2013-103149 A
Patent Literature 4: JP 5378148 B
Patent Literature 5: JP 2002-066313 A
Patent Literature 6: JP 2002-179406 A

SUMMARY OF INVENTION

Technical Problem

An object of the present invention is to provide a reforming catalyst that gives a high ratio of conversion into hydrogen gas and has a long-term stability while inhibiting the generation of ammonia or carbon deposition, in the steam reforming reaction for obtaining hydrogen gas from a hydrocarbon-based gas in the presence of steam.

Another object of the present invention is to provide a steam reforming catalyst that can suppress the generation of ammonia, and maintain sufficiently high reactivity, while achieving a reduction in price by reducing the necessary amount of expensive platinum-group element.

A further object of the present invention is to provide a reforming catalyst that is combined with an appropriate desulfurization treatment by a suitable desulfurizer, preferably a super higher-order desulfurizer or an ordinary temperature desulfurizer, thereby achieving both long-term stability and a reduction in costs attributed to a reduction in the loading amount of active metal, and provide an apparatus for producing hydrogen including a desulfurizer as described above and a reformer in which the catalyst of the present invention is mounted.

Other objects of the present invention will become apparent from the following description.

Solution to Problem

In view of the above-described actual circumstances, the present inventors conducted extensive research to solve the drawbacks of the conventional art, and consequently obtained the following principles and results as ideas for solving the problem in the present invention:

(1) It is preferable to use a combination of Rh and Pt (Patent Literature 3, for example) as active metals, from the standpoint of high activity and prevention of the ammonia generation.

(2) However, a structure in which an alloy system of Rh and Pt is supported on α-alumina is likely to undergo degradation due to sulfur adsorption onto Pt, and also requires improvement in terms of activity.

(3) In order to prevent such poisoning with a sulfur compound, Patent Literature 4 discloses a catalyst in which Rh and Pt are supported on an alumina carrier modified with an alkaline earth metal such as Ce or Sr. The catalyst of Example 3 in Patent Literature 4, however, is not practical in terms of cost, because of the high loading amount of the active metal.

(4) The present inventors studied catalyst compositions under conditions combined with a desulfurization pretreatment, using Example 3 of Patent Literature 4 as a starting point, and consequently found that the activity can be maintained even if the loading amount of active metal is significantly reduced compared to that in the conventional alloy system, and that when α-alumina is modified with a combination of Ce and other rare-earth elements, preferably a combination of Ce with La and Y, the activity is improved, and the stability is also improved.

(5) The reforming catalyst thus obtained, when combined with a desulfurizer, offers high activity and estimated long-term stability of at least 1 year (approximately 10 years), as measured using an accelerated test, even if the loading amount of active metal is approximately one-third to one-tenth of that in Patent Literature 4.

The present inventors thus arrived at the present invention.

In summary, the present invention relates to the following:
1. A steam reforming catalyst, comprising active metals supported on an α-alumina carrier,
wherein the active metals comprise 0.1 to 0.3 parts by weight of rhodium (Rh) based on the content of the metal, relative to 100 parts by weight of the α-alumina carrier, and 0.01 to 0.3 parts by weigh of platinum (Pt) based on the content of the metal, relative to 100 parts by weight of the α-alumina carrier, and the α-alumina carrier is a carrier modified with a promoter comprising 1 to 10 parts by weight of cerium (Ce) based on the content of the metal, relative to 100 parts by weight of the α-alumina carrier, and wherein said catalyst is for steam reforming of a desulfurized hydrocarbon-containing gas.

2. The steam reforming catalyst according to item 1 above, wherein the hydrocarbon-containing gas is a hydrocarbon-containing gas desulfurized using a super higher-order desulfurization method or an ordinary temperature desulfurization method.

3. The steam reforming catalyst according to item 1 or 2 above, wherein a loading amount of Rh is 0.10 parts by weight or more and less than 0.3 parts by weight based on the content of the metal, relative to 100 parts by weight of the α-alumina carrier, and a loading amount of Pt is 0.01 parts by weight or more and less than 0.2 parts by weight based on the content of the metal, relative to 100 parts by weight of the α-alumina carrier.

4. The steam reforming catalyst according to any one of items 1 to 3 above, wherein a total loading amount of Rh and Pt is 0.11 parts by weight or more and less than 0.3 parts by weight based on the content of the metal, relative to 100 parts by weight of the α-alumina carrier.

5. The steam reforming catalyst according to any one of items 1 to 4 above, wherein the active metals are free of nickel (Ni), or comprises Ni in an amount less than 1 part by weight based on the content of the metal, relative to 100 parts by weight of the α-alumina carrier.

6. The steam reforming catalyst according to any one of items 1 to 5 above, wherein the promoter further comprises 0.6 to 15 parts by weight of a rare-earth element other than Ce based on the content of the metal, relative to 100 parts by weight of the α-alumina carrier.

7. The steam reforming catalyst according to item 6 above, wherein the rare-earth element other than Ce and the Ce form a solid solution on the modified carrier.

8. The steam reforming catalyst according to item 6 or 7 above, wherein the rare-earth element other than Ce is lanthanum (La) and/or yttrium (Y).

9. The steam reforming catalyst according to any one of items 6 to 8 above, wherein the rare-earth elements Other than Ce are La and Y, and the promoter comprises 0.4 to 10 parts by weight of La based on the content of the metal, relative to 100 parts by weight of the α-alumina carrier, and 0.2 to 5 parts by weight of Y based on the content of the metal, relative to 100 parts by weight of the α-alumina carrier.

10. The steam reforming catalyst according to any one of items 1 to 9 above, which is free of alkali earth metal element, or comprises less than 0.1 parts by weight of an alkali earth metal element based on the content of the metal, relative to 100 parts by weight of the α-alumina carrier.

11. The steam reforming catalyst according to any one of items 1 to 10 above, which has an active metal dispersion degree of 35% or more, measured using a carbon monoxide pulse chemisorption method.

12. The steam reforming catalyst according to any one of items 7 to 11 above, which has a diffraction peak at a position of 2θ=27 to 29.5° in X-ray diffraction measurement.

13. The steam reforming catalyst according to any one of items 1 to 12 above for steam reforming a hydrocarbon-containing gas which contains nitrogen.

14. A method for producing hydrogen comprising contacting the steam reforming catalyst according to any one of items 1 to 13 above with a desulfurized hydrocarbon-containing gas and steam.

15. The method for producing hydrogen according to item 14 above, wherein the hydrocarbon-containing gas contains nitrogen.

16. The method for producing hydrogen according to item 14 or 15 above, wherein the steam reforming catalyst is contacted with the desulfurized hydrocarbon-containing gas and steam in a steam reformer filled with the steam reforming catalyst, and the steam reformer is operated for 1 year or longer cumulatively, without replacing the catalyst.

17. An apparatus for producing hydrogen comprising:

a super higher-order desulfurizer or an ordinary temperature desulfurizer for removing a sulfur component from a hydrocarbon-containing gas supplied through a supply passage for the hydrocarbon-containing gas; and a steam reformer filled with the steam reforming catalyst according to any one of items 1 to 13 above, for reforming the hydrocarbon-containing gas desulfurized by the desulfurizer.

18. A method for preparing the steam reforming catalyst according to any one of items 1 to 13 above, comprising:

(a) modifying an α-alumina carrier with a promoter containing 1 to 10 parts by weight of Ce based on the content of the metal, relative to 100 parts by weight of the α-alumina carrier, preferably modifying the α-alumina carrier through impregnation with the promoter; and (b) loading, onto the resulting modified carrier, catalytic active metals containing 0.1 to 0.3 parts by weight of Rh based on the content of the metal, relative to 100 parts by weight of the α-alumina carrier, and 0.01 to 0.3 parts by weight of Pt based on the content of the metal, relative to 100 parts by weight of the α-alumina carrier.

19. The preparation method according to item 18 above, wherein the promoter further contains 0.60 to 15 parts by weight of a rare-earth element other than Ce based on the content of the metal, relative to 100 parts by weight of the α-alumina carrier.

20. Use of the steam reforming catalyst according to any one of items 1 to 13 above for steam reforming of a desulfurized hydrocarbon-containing gas.

BRIEF DESCRIPTION OF DRAWINGS

FIG. 1 is a graph of the conversion against the ratio of Pt contained in the active metals, based on the data shown in Table 2.

FIG. 2 is a graph of the conversion against the Rh loading amount (parts by weight of Rh relative to 100 parts by weight of the α-alumina carrier), based on the data shown in Table 2.

FIG. 3 is a graph of the conversion against the amount of Ce (part(s) by weight of Ce relative to 100 parts by weight of the α-alumina carrier), based on the data shown in Table 2.

FIG. 4 is a graph of the dispersion degree (%) of the active metals versus the conversion (%), based on the data shown in Table 2.

FIG. 5 is a graph of the deactivation ratio against the reaction time under accelerated conditions, based on the data shown in Table 3, wherein the deactivation ratio is represented by [(the conversion ratio at reaction time t)/(the initial conversion ratio)]×100.

FIG. 6 shows diffraction patterns obtained in the X-ray diffraction (XRD) measurement in Example 11.

DESCRIPTION OF EMBODIMENTS

The steam reforming catalyst of the present invention is for steam reforming a hydrocarbon-containing gas, in particular, a desulfurized hydrocarbon-containing gas. Furthermore, the steam reforming catalyst of the present invention is one in which a catalytic active metal is further supported on a modified carrier obtained by modifying an α-alumina carrier with a promoter, preferably on a modified carrier obtained by modifying the α-alumina carrier through impregnation with the promoter (that is, on the α-alumina carrier having the promoter supported thereon).

In an embodiment of the present invention, the present invention relates to a steam reforming catalyst comprising active metals supported on an α-alumina carrier, wherein the active metals comprise 0.1 to 0.3 parts by weight of rhodium (Rh) based on the content of the metal, relative to 100 parts by weight of an α-alumina carrier, and 0.01 to 0.3 parts by weight of platinum (Pt) based on the content of the metal, relative to 100 parts by weight of the α-alumina carrier, and the α-alumina carrier is modified with a promoter containing 1 to 10 parts by weight of cerium (Ce) based on the content of the metal, relative to 100 parts by weight of the α-alumina carrier, preferably modified through impregnation with said promoter, and wherein said catalyst is for steam reforming a desulfurized hydrocarbon-containing gas.

In the catalyst of the present invention, α-alumina is used as the carrier. In addition to alumina having the α-form crystal structure, alumina having a crystal structure such as β- or γ-form is known. However, α-form alumina is low in cost since it is generally widely used, and also has a high physical strength at high temperatures. Thus, α-alumina is particularly preferable as the carrier for the catalyst used in a continuous reaction at high temperatures for a long time, as with the intended steam reforming catalyst of the present invention.

A commercial product is available as the α-alumina, and α-alumina having a purity of 90% or more, preferably a purity of 99% or more, can be used as the carrier for the catalyst of the present invention.

The α-alumina carrier preferably has the following surface characteristics.

The α-alumina carrier preferably has a specific surface area of 2 to 7 m²/g, as measured using the nitrogen gas adsorption method (BET method). When the specific surface area is 2 m²/g or more, particularly satisfactory reactivity is achieved, and when the specific surface area is 7 m²/g or less, a particularly sufficient physical strength of the catalyst is achieved.

The α-alumina carrier described above also preferably has a mean pore size of 100 to 500 nm, as measured using the mercury intrusion method. When the mean pore size is within this range, particularly satisfactory reactivity can be achieved.

Furthermore, the α-alumina carrier preferably has a pore volume of 0.35 to 0.95 ml/g, as measured using the mercury intrusion method. When the pore volume is 0.35 ml/g or more, the reactivity and stability are particularly satisfactory, and when the pore volume is 0.95 ml/g or less, a particularly satisfactory physical strength of the catalyst is achieved.

The α-alumina carrier in any form can be used, such as spherical, oval, annular, rod-shaped, particulate, honeycomb-shaped, and other forms, without being particularly limited thereto.

In the catalyst of the present invention, the α-alumina carrier is modified with a promoter (hereinafter also referred to as the "modifier") (preferably modified through impregnation with the promoter), wherein the promoter contains Ce. In an embodiment of the present invention, the promoter is Ce. That is, in the above-described catalyst of the present invention, Ce as the modifying element is supported on the α-alumina carrier. It was found in the present invention that Ce has the activity-assisting effect of increasing the steam reforming activity, and thus, the activity of the reforming catalyst is improved by using a modified carrier in which the α-alumina carrier is modified with Ce, and preferably a modified carrier obtainable by impregnating the α-alumina carrier with Ce.

The modification with Ce can be accomplished by, for example, soaking α-alumina in an aqueous solution of a Ce salt such as its nitrate salt, and recovering the resulting product from the solution, followed by drying and calcining it, as will be described in the Examples below. Through this modification, Ce is supported on the α-alumina carrier. For example, Ce is supported in the form of an oxide (cerium oxide) on the α-alumina carrier.

Preferably, the loading amount of Ce in the modified carrier obtained as described above is, for example, 1.0 parts by weight or more and 10 parts by weight or less, calculated as metal weight, relative to 100 parts by weight of the α-alumina carrier. More preferably, the loading amount of Ce is 1.5 parts by weight or more and 6 parts by weight or less, for example, 2 parts by weight or more and 5 parts by weight or less. If the loading amount of Ce is less than 1 part by weight, the reactivity will decrease, and if the loading amount of Ce is over 10 parts by weight, an increase in costs will be incurred, and there will be a greater decrease in the stability of the catalyst.

In an embodiment of the present invention, the promoter contains Ce only as the metal component. That is, in this case, Ce is the only metal that is used to modify the α-alumina carrier, preferably is the only metal with which the α-alumina carrier is impregnated.

In a further embodiment of the present invention, the promoter described above contains at least one other rare-earth elements in addition to Ce. That is, in this embodiment, the α-alumina carrier is modified by adding, to the promoter described above, the rare-earth elements other than Ce, typically second and third rare-earth elements. In this case also, the modification can be accomplished as described above (that is, for example, α-alumina is soaked in an aqueous solution of a Ce salt such as its nitrate salt and salts of other rare-earth elements, and then dried and calcined), and through this modification, Ce and the other rare-earth elements are supported on the α-alumina carrier. For example, the other rare-earth elements in the form of oxides are supported on the α-alumina carrier. Furthermore, in an embodiment of the present invention, the promoter only contains Ce and the other rare-earth elements as metal components, i.e. Ce and the rare-earth elements described above are the only metals used in this case to modify the α-alumina carrier and they are preferably the only metals with which the α-alumina carrier is impregnated.

The purpose of this modification of the α-alumina carrier with the promoter containing Ce and the rare-earth elements other than Ce is mainly to improve the stability, and through this effect, degradation of the catalyst due to the steam reforming reaction can be prevented, and the activity can be simultaneously improved (activity-assisting effect).

In the present invention, it was confirmed through a stability evaluation test that, although Ce improves the initial activity of the catalyst by improving the degree of dispersion of the active metals, it also causes the stability to decrease. As a solution to this problem, however, a catalyst having an α-alumina carrier modified by having rare-earth elements other than Ce, typically second and third rare-earth elements, added to it exhibited stability higher than that of a catalyst to which such rare-earth elements were not added.

As the rare-earth elements other than Ce, preferably second and third rare-earth elements, to be used in combination with Ce, one or more elements that are appropriately selected from a group consisting of lanthanum (La), yttrium (Y), scandium (Sc), neodymium (Nd), samarium (Sm), gadolinium (Gd) and terbium (Tb) can be used. Of the above, La (lanthanum) and Y (yttrium) are particularly preferable. La and/or Y is preferably used as the rare-earth elements other than cerium described above, because they are excellent in the formation of a solid solution described below, and a combination of La and Y is particularly preferably used. In an embodiment of the present invention, the promoter described above is composed of Ce, La and Y.

In a preferred embodiment of the present invention, therefore, the promoter only contains the combination of Ce, La and Y as the metal components. That is, in this case, Ce, La and Y are the only metals to be used to modify the α-alumina carrier, preferably also the only metals with which the α-alumina carrier is impregnated, and through this modification (preferably by means of impregnation), Ce, La and Y are supported on the α-alumina carrier.

It was also found in the present invention that a particularly noticeable improvement in stability can be achieved by using the combination of rare-earth elements described above.

Furthermore, it was found in the present invention that on the surface of the α-alumina carrier modified with Ce and other rare-earth elements (preferably La and Y), a solid solution between Ce and the other rare-earth elements is formed, and the formation of this solid solution was considered to contribute to the improvement of the long-term stability of the reforming catalyst described above.

The loading amount of a rare-earth element other than Ce in the modified α-alumina carrier (when a plurality of rare-earth elements other than cerium is used, the total loading amount of the rare-earth elements) can be, for example, 0.6 to 15 parts by weight calculated as metal weight, relative to 100 parts by weight of the α-alumina carrier, and preferably 1 to 10 parts by weight, more preferably 2 to 7 parts by weight, and particularly preferably 4 to 6 parts by weight. When the loading amount of the rare-earth element other than Ce is 1.0 parts by weight or more, a noticeable improvement in the stability of the catalyst is achieved, and when the loading amount is less than 10 parts by weight, the solid solution described above is particularly suitably formed.

When the amount of each component is described using the phrase "relative to 100 parts by weight of the α-alumina carrier" as used herein, this phrase means that the amount is based on 100 parts by weight of the α-alumina carrier before being modified with Ce or a combination of Ce and other rare-earth elements (for example, La and Y).

When La is used as the rare-earth element other than Ce, the loading amount of La in the catalyst of the present invention is preferably 0.4 parts by weight or more and 10 parts by weight or less based on the content of the metal, relative to 100 parts by weight of the α-alumina carrier, and is more preferably 0.5 parts by weight or more and 6 parts by weight or less, still more preferably 1 part by weight or more and 4.0 parts by weight or less, and particularly preferably 2.5 parts by weight to 3.5 parts by weight. The stability of the catalyst does not decrease, and there is significant improvement in the activity, particularly when the loading amount of La is 0.4 parts by weight or more. When the loading amount of La is 10 parts by weight or less, a particularly suitable solid solution is formed, and it is unlikely that the stability will decrease.

When Y is used as the rare-earth element other than Ce, the loading amount of Y in the catalyst of the present invention is 0.2 parts by weight or more and 5 parts by weight or less based on the content of the metal, relative to 100 parts by weight of the α-alumina carrier, and is more preferably 0.5 parts by weight or more and 4 parts by weight or less, and particularly preferably 1 part by weight or more and 3.0 parts by weight or less, or 1.5 parts by weight or more and 2.5 parts by weight or less. There is no decrease in the stability of the catalyst, and the effect of improving the activity is significant, particularly when the loading amount of Y is 0.2 parts by weight or more. When the loading amount of Y is 5.0 parts by weight or less, a particularly suitable solid solution is formed, and it is unlikely that the stability will decrease.

As described above, the activity and stability of the catalyst can be improved by using Ce in combination with rare-earth elements other than Ce, particularly preferably lanthanum and yttrium. One reason why the combination of these components, particularly preferably the combination of Ce with La and Y, improves the activity and stability of the catalyst is considered to be its contribution to the formation of a solid solution. The mechanism is therefore considered to involve inhibiting a decrease in metal surface area due to sintering, and inhibiting carbon deposition.

The formation of this solid solution can be confirmed through X-ray diffraction measurement (XRD measurement), and the solid solution formed between Ce, La and Y, for example, has a peak derived from the solid solution at $2\theta=27$ to $29.5°$ in the X-ray diffraction measurement.

In an embodiment of the present invention, the steam reforming catalyst of the present invention is substantially free of alkaline earth metal, or contains an alkaline earth metal in an amount of less than 0.1 parts by weight based on the content of the metal, relative to 100 parts by weight of the α-alumina carrier. When the content of the alkaline earth metal is less than 0.1 parts by weight, interference with the formation of a solid solution between Ce and other rare-earth elements, which may decrease stability, can be prevented.

The catalytic active metals in the catalyst of the present invention include Rh and Pt. Preferably, the active metals are composed of Rh and Pt, and is an alloy of Rh and Pt, for example.

The loading amount of Rh in the reforming catalyst of the present invention is 0.1 to 0.3 parts by weight, and preferably 0.1 parts by weight or more and less than 0.3 parts by weight, based on the content of the metal, relative to 100 parts by weight of the α-alumina carrier. If the Rh loading amount is less than 0.1 parts by weight, the activity will decrease, and if the Rh loading amount is over 0.3 parts by weight, the catalytic activity shows a tendency toward saturation, and thus, there is no advantage commensurate with the increase in catalyst production costs. For example, from the standpoint of increasing the conversion ratio and reducing costs, Rh can be supported in an amount of between 0.1 and 0.2 parts by weight, for example, 0.1 to 0.15 parts by weight, based on the content of the metal, relative to 100 parts by weight of the α-alumina carrier.

The loading amount of Pt in the reforming catalyst of the present invention is 0.01 to 0.3 parts by weight, and preferably 0.01 parts by weight or more and less than 0.3 parts by weight, based on the content of the metal, relative to 100 parts by weight of the α-alumina carrier. If the Pt loading amount is less than 0.01 parts by weight, ammonia is likely to be generated, and if the Pt loading amount is over 0.3 parts by weight, adverse effects will occur, such as decreased activity, or decreased stability due to the adsorption of a sulfur component. An increase in the amount of Pt also causes an increase in catalyst production costs, and thus, is not preferable.

Furthermore, it was found in the present invention that the generation of ammonia can be prevented even if the loading amount of Pt in the reforming catalyst is small, and the catalytic activity rather tends to increase in a certain range of these small Pt loading amounts. In an embodiment of the present invention, therefore, the Pt loading amount can be, for example, 0.01 parts by weight or more and less than 0.2 parts by weight, or 0.02 parts by weight or more and less than 0.15 parts by weight, or 0.03 parts by weight or more and less than 0.1 parts by weight.

The total amount of the active metal contained in the steam reforming catalyst of the present invention is 0.11 to 0.6 parts by weight based on the content of the metal, relative to 100 parts by weight of the α-alumina carrier. Preferably, the total content of the active metal is 0.11 parts by weight or more and less than 0.30 parts by weight, for example, 0.11 parts by weight or more and less than 0.25 parts by weight, based on the content of the metal, relative to 100 parts by weight of the α-alumina carrier. If the total content of the active metal is excessively low, the activity tends to decrease, and the production stability is likely to also decrease because the minute amount of the metal needs to be evenly dispersed. If the total content of the active metal is over 0.6 parts by weight, the catalyst production costs will increase due to the high cost of Pt or Rh, which is likely to become an obstacle to the widespread use of the system for producing hydrogen.

Furthermore, in order to obtain a high conversion ratio, Rh is preferably loaded into the active metals at a composition of 40 wt % or more and 95 wt % or less, and more preferably at a composition of 65 wt % or more and 90 wt % or less, based on the total weight of the active metals.

The active metals of the reforming catalyst of the present invention may contain a metal other than Rh and Pt, as long as the effects of the present invention are not lost. Examples of such metals include platinum-group elements and transition-metal elements, such as Ru and Co (cobalt), for example.

When, however, the active metals contain a metal other than Rh and Pt, there is a possibility that adverse effects such as carbon deposition and the generation of ammonia may occur. Therefore, the amount of such a metal is preferably small, i.e. less than 10 parts by weight, more preferably less than 5 parts by weight, and particularly preferably less than 1 part by weight, based on the total weight of the active metal. For example, the active metal is preferably substantially free of metal other than Rh and Pt.

In a preferred embodiment of the present invention, from the standpoint of preventing an increase in carbon deposition or catalytic activity degradation, in the steam reforming catalyst of the present invention, the active metals are substantially free of Ni, or contain Ni in an amount less than 1 part by weight, preferably less than 0.5 parts by weight, more preferably less than 0.2 parts by weight, and particularly preferably less than 0.1 parts by weight, based on the content of the metal, relative to 100 parts by weight of the α-alumina carrier.

In a further embodiment of the present invention, the steam reforming catalyst can have a metal dispersion degree of 35% or more, and preferably has a metal dispersion degree of 40% or more, and more preferably 45% or more or 50% or more, as measured using the carbon monoxide pulse chemisorption method.

The steam reforming catalyst of the present invention can be produced using the method described below, for example. Here, the case where the promoter is a combination of Ce, La and Y will be described as a representative example of the method for preparing the steam reforming catalyst; however, the steam reforming catalyst of the present invention can be similarly produced in other cases such as, for example, where Ce only is used as the promoter, or where a combination of Ce with either La or Y is used as the promoter.

The reforming catalyst described above is obtained by modifying an α-alumina carrier by loading Ce, La, and Y thereon, and then loading Rh and Pt on the modified alumina carrier. As the method for loading these components on α-alumina, common methods such as impregnation and pore-filling can be adopted. Loading may be performed either successively or simultaneously. As used herein, the pore-filling method is a technique for loading a metal on a carrier by measuring in advance the pore volume of the carrier, and impregnating the carrier with an equivalent volume of a metal salt solution.

In the impregnation or pore-filling method for loading Ce, La and Y on α-alumina, a solution of Ce, La and Y dissolved in water, ethanol or acetone can be used. Ce, La and Y can each be used e.g. in the form of a compound, and their respective chloride, nitrate, sulfate, acetate, acetoacetate or the like can be used as the compound of each of Ce, La and Y.

Drying is performed after Ce, La and Y are loaded on the α-alumina carrier. The drying step can be carried out by heat drying or vacuum drying. One exemplary method involves drying the resulting carrier in an air atmosphere, or in an inert gas atmosphere such as nitrogen or argon, at a temperature of 100° C. or higher, for a time period of 2 hours or longer.

After the drying step, the carrier can be subjected to a calcination step. In the calcination step, the α-alumina carrier having Ce, La and Y supported thereon is preferably calcined at a temperature of 600° C. or higher. When the calcination temperature is 600° C. or higher, Ce, La and Y can be sufficiently immobilized onto the alumina. The calcination atmosphere is preferably an air atmosphere, and the air flow rate is not particularly restricted. The calcination time is preferably 2 hours or longer to sufficiently immobilize Ce, La and Y onto the alumina.

Rh and Pt are loaded as active metals on the modified α-alumina carrier obtained as above, and the resulting carrier is dried, and optionally are subjected to a reduction treatment, metal-immobilization treatment and/or calcination, thereby obtaining a reforming catalyst.

As the method for loading the active metals, common methods such as impregnation and pore-filling can be adopted, for example. In the impregnation or pore-filling method for loading the active metals on the modified alumina carrier, a solution of compounds of the active metals dissolved in a solvent of water, ethanol or acetone can be used. As the compound of each of the active metals, the respective chloride, nitrate, sulfate, acetate or acetoacetate, for example, can be used. Loading may be performed once, twice or more. After the active metals are loaded, the carrier having the active metals supported thereon can be subjected to a drying step. The drying step can be carried out by heat drying or vacuum drying. One exemplary method involves drying said carrier in an air atmosphere, or an inert gas atmosphere such as nitrogen or argon, at a temperature of 100° C. or higher, for 2 hours or longer. Examples of methods of reduction treatment include vapor-phase reduction and liquid-phase reduction, in a hydrogen atmosphere. In the calcination method, the active metals can be sufficiently immobilized onto the carrier at 400° C. or higher and 800° C. or lower. The calcination time is preferably 2 hours or longer.

In an embodiment of the present invention, therefore, the present invention relates to a method for preparing the steam reforming catalyst described above, comprising:

(a) modifying an α-alumina carrier with a promoter containing 1 to 10 parts by weight of Ce based on the content of the metal, relative to 100 parts by weight of the α-alumina carrier, preferably modifying the α-alumina carrier through impregnation with the promoter; and (b) loading, onto the resulting modified carrier, catalytic active metals containing 0.1 to 0.3 parts by weight of Rh based on the content of the metal, relative to 100 parts by weight of the α-alumina carrier, and 0.01 to 0.3 parts by weight of Pt based on the content of the metal, relative to 100 parts by weight of the α-alumina carrier.

In a further embodiment of the present invention, the present invention relates to the above-described preparing method wherein the promoter further contains 0.60 to 15 parts by weight of a rare-earth element other than Ce based on the content of the metal, relative to 100 parts by weight of the α-alumina carrier.

Using the catalyst of the present invention, a hydrocarbon-containing gas can be reformed to produce hydrogen gas. Specifically, in a steam reformer having the above-described reforming catalyst, hydrogen gas (typically, a reformed gas containing hydrogen and carbon monoxide) can be produced by contacting the reforming catalyst with a hydrocarbon-containing gas and steam. Because the catalyst of the present invention has long-term stability as described above, in the present invention, the reformed gas containing carbon monoxide and hydrogen can be achieved by reacting a hydrogen-producing feedstock containing a hydrocarbon gas with steam, without replacing the catalyst, in a steam reformer (a steam reforming reactor including the reformer) for 1 year or longer (approximately 9,000 hours or more when converted to hours) cumulatively, preferably for 10 years or longer (approximately 90,000 hours or more when converted to hours) cumulatively, in the presence of the reforming catalyst described above.

As used herein, the phrase "1 year or longer cumulatively" means that the period determined by summing up the cumulative times during which the steam reformer (or the steam reforming reactor including the reformer) is operated is 1 year or more.

As the steam reformer described above, a flow-through fixed bed reactor or a fluidized bed reactor, for example, can be used. The shape of the reactor can be appropriately selected; for example, a cylindrical or plate-like reactor is used.

For the steam reforming treatment of a hydrocarbon-containing gas by using the steam reforming catalyst according to the present invention, lower hydrocarbons such as methane, ethane, propane, butane and naphtha, for example, can be used as hydrocarbon-containing gases serving as feedstocks, and additionally, so-called shale gas can be used. Kerosene, for example, can also be used in gasified form. Particularly preferably, however, methane is used as the hydrocarbon-containing gas. Furthermore, because the use of the catalyst of the present invention inhibits the generation of ammonia, the hydrocarbon-containing gas may contain nitrogen. The nitrogen content in the hydrocarbon-containing gas serving as the feedstock can be 0.5 to 30% based on the total amount of the hydrocarbon-containing gas, and is preferably less than 20%, more preferably less than 10%, and particularly preferably less than 5%.

With regard to the steam reforming treatment of a hydrocarbon-containing gas by using a steam reforming catalyst, the hydrocarbon-containing gas serving as the feedstock typically contains sulfur compounds such as mercaptan. These sulfur compounds poison the steam reforming catalyst. Therefore, in the present invention, the hydrocarbon-containing gas is desulfurized before being subjected to the steam reforming treatment using the reforming catalyst. Examples of modes of desulfurization generally include hydrodesulfurization, ordinary temperature desulfurization using a zeolite or the like, and super higher-order desulfurization using a Cu—Zn-based or Cu—Zn—Al-based desulfurizing agent. It is considered that the hydrodesulfurization mode can remove sulfur to approximately 0.1 ppm, ordinary temperature desulfurization can remove sulfur to about several ppb, and the super higher-order desulfurization mode can remove sulfur to a level of 0.1 ppb. For steam reforming in the present invention, any mode of desulfurization can be selected and used in accordance with the sulfur concentration or other characteristics of the feed gas; however, the ordinary temperature desulfurization or super higher-order desulfurization mode is particularly preferable. Examples of desulfurizing agents for ordinary temperature desulfurization include, in addition to the silver-zeolite-based adsorbent described in Patent Literature 5 described above, copper-zeolite-based adsorbents (for example, HyProGen® GS-23; Clariant Catalysts K.K.) and adsorbents composed of a composite oxide of copper oxide and manganese oxide (for example, HyProGen® GS-6; Clariant Catalysts K.K.). Among the above-described modes, the ordinary temperature desulfurization mode or super higher-order desulfurization mode, which exhibits high desulfurization performance, and has long-term desulfurization performance of approximately 10 years because of a recent improvement, is optimal for preventing degradation due to sulfur, and achieving an extended catalyst lifetime, for the steam reforming catalyst according to the present invention. In an embodiment of the present invention, therefore, the hydrocarbon-containing gas serving as the feedstock has been desulfurized using an appropriate desulfurization treatment, and has been preferably desulfurized using the ordinary temperature desulfurization or super higher-order desulfurization method. The sulfur concentration of the hydrocarbon-containing gas thus desulfurized is preferably less than 0.1 ppm, more preferably less than 10 ppb, still more preferably less than 1 ppb, and particularly preferably less than 0.1 ppb, or at an undetectable level.

As described above, methods for desulfurizing a hydrocarbon-containing gas and desulfurizing agents or desulfurizers used therefor are well known to those skilled in the art, and such known ones can also be used in the present invention. For example, the hydrocarbon-containing gas can be desulfurized with a desulfurizer placed upstream the steam reformer. In this case, hydrocarbons supplied through a supply passage from a fuel tank or the like are either directly, or after being gasified by heating, as required, introduced into the desulfurizer to remove a sulfur component, which is preferably an ordinary temperature desulfurizer or super higher-order desulfurizer. When an ordinary temperature desulfurizer or super higher-order desulfurizer is used, a hydrocarbon-containing gas desulfurized with high precision through a zeolite-based desulfurizing agent or a Cu—Zn-based desulfurizing agent (or a Cu—Zn—Al-based desulfurizing agent) within the desulfurizer can be obtained, and this hydrocarbon-containing gas can be used for the steam reforming using the catalyst described above. For example, the hydrocarbon-containing gas desulfurized with high precision is introduced into the steam reformer filled with the catalyst, which is connected downstream, to perform the steam reforming treatment.

In the steam reforming treatment, the reaction temperature can be 500 to 1,200° C., and preferably 550 to 1,000° C., and the reaction pressure can be 1 to 40 kg/cm², and preferably 5 to 30 kg/cm². The gas hourly space velocity (GHSV) in the case where the reaction is performed using the fixed bed mode is preferably 500 to 20,000 hr$^{-1}$, and more preferably 1,000 to 15,000 hr$^{-1}$.

The proportion of steam used relative to the hydrocarbon-containing gas, which is expressed as the steam/carbon ratio (S/C), may be 0.5 to 5 moles, preferably 1 to 3 moles, and more preferably 2 to 2.7 moles of steam, per mole of carbon (calculated as methane) in the hydrocarbon-containing gas.

The method for producing hydrogen described above is particularly suitable to produce hydrogen to be supplied to fuel cells, without being limited thereto, and the hydrogen produced is also used in the form of an aqueous gas as various chemical-reaction feedstocks, and is also suitable to be used as a feed gas for the hydrogen reduction reaction, for example.

EXAMPLES

The present invention will be specifically described with reference to examples below; however, the invention is in no way limited to these examples.

Example 1

α-alumina was impregnated with an aqueous solution of the respective nitrates of Ce, La, and Y as modifiers. At this time, the nitrates were dissolved in water so that the loading amounts of Ce, La and Y became 5.0 parts by weight, 3.0 parts by weight and 1.5 parts by weight, respectively, each calculated as the weight of the metal, relative to 100 parts by weight of α-alumina, and α-alumina was impregnated with the aqueous solution thus obtained. The resulting product was subsequently dried at 100° C. for 2 hours, and then calcined at 600° C. for 2 hours, thereby obtaining a modified carrier. This modified carrier was impregnated with Rh nitrate and di-nitro di-ammine platinum so that the loading amounts of Rh and Pt became 0.15 parts by weight and 0.20 parts by weight, respectively, each based on the content of the metal, relative to 100 parts by weight of the α-alumina carrier, and the resulting carrier was dried at 100° C. for 2 hours and then calcined in an air atmosphere at 600° C. for 2 hours, thereby obtaining a reforming catalyst. In the reforming catalyst thus obtained, the loading amounts of Ce, La and Y (parts by weight), the loading amount of each of Rh and Pt as active metals and the total loading amount of Rh and Pt (parts by weight), and the Rh composition (parts by weight) in the active metals, relative to 100 parts by weight of the α-alumina carrier, were calculated. The results are shown in Table 2.

The conversion was calculated as the amount of hydrogen produced (the number of moles)/the amount of feed gas supplied (the number of moles of methane $CH_4$). The part(s) by weight was calculated based on the content of the metal.

Example 2

A reforming catalyst was obtained as in Example 1, except that impregnation with Rh nitrate and di-nitro di-ammine platinum was conducted so that the loading amounts of Rh and Pt became 0.15 parts by weight and 0.05 parts by weight, respectively, each based on the content of the metal, relative to 100 parts by weight of the α-alumina carrier. The loading amounts (part(s) by weight) relative to 100 parts by weight of the α-alumina carrier, etc. in the catalyst thus obtained are shown in Table 2.

Examples 3 to 8

Reforming catalysts were obtained by the same method as in Example 1, except that the impregnation was carried out so that the loading amounts (part(s) by weight) of each of Ce, La, Y, Rh and Pt, based on the content of the metal, relative to 100 parts by weight of α-alumina, were the values of Examples 3 to 8 shown in Table 2.

Comparative Example 1

A reforming catalyst of Comparative Example 1 was obtained as in Example 1, except that the catalyst was made not to contain Ce supported on it, and impregnation with La and Y was conducted so that the loading amounts of La and Y became 3.0 parts by weight and 2.0 parts by weight, respectively, each based on the content of the metal, relative to 100 parts by weight of α-alumina.

Comparative Example 2

A reforming catalyst of Comparative Example 2 was obtained as in Example 1, except that the catalyst was made not contain Ce, La and Y supported on it, and also not contain Pt supported on it, and the loading amount of Rh was changed to 0.2 parts by weight based on the content of the metal, relative to 100 parts by weight of α-alumina.

Comparative Example 3

A reforming catalyst of Comparative Example 3 was obtained as in Comparative Example 2, except that the loading amount of Rh was changed to 0.1 parts by weight based on the content of the metal, relative to 100 parts by weight of α-alumina.

Comparative Example 4

A reforming catalyst of Comparative Example 4 was obtained as in Comparative Example 2, except that the loading amount of Rh was changed to 0.08 parts by weight, and the loading amount of Pt was changed to 0.12 parts by weight, each based on the content of the metal, relative to 100 parts by weight of α-alumina.

Comparative Example 5

A reforming catalyst of Comparative Example 5 was obtained as in Comparative Example 2, except that the loading amount of Rh was changed to 0.15 parts by weight, and the loading amount of Pt was changed to 0.25 parts by weight, each based on the content of the metal, relative to 100 parts by weight of α-alumina.

Example 9

Reforming Reaction Tests

Reforming reaction tests were performed using the catalyst samples of Examples 1 to 8 and the catalyst samples of Comparative Examples 1 to 5. A fixed-type reactor was filled with a predetermined amount of the catalyst; subsequently, a feed gas (purity: 99.9%, methane $CH_4$) desulfurized by a super higher-order desulfurization apparatus was introduced into the reactor, and the conditions of pressure, temperature and gas hourly space velocity were adjusted. In each of the tests, after the reaction, the amount of hydrogen as the product, the amount of remaining methane and the amount of ammonia produced were measured by gas chromatography, and the conversion of methane and the concentration of ammonia were determined. The conditions for the steam reforming reaction tests were as shown in "Test Conditions 1" in Table 1. The test results are shown in Table 2. In Table 2, the designation "N.D." stands for "not detected".

TABLE 1

| | Test Conditions | | |
|---|---|---|---|
| | Test Conditions 1 | Test Conditions 2 | Remarks |
| Purpose | Evaluation of Correlation between Catalyst Components and Conversion | Evaluation of Stability | |
| Feed Gas | Commercial Methane Gas (Methane Purity: 99.9% or More) (Sulfur Compound Content: Less Than 1 ppb) | LP Gas after Super Higher-Order Desulfurization (Sulfur Compound Content: Less Than 1 ppb) | |
| S/V | 10,000 $h^{-1}$ | 10,000 $h^{-1}$ | Space Velocity |
| S/C Ratio | 2.5 | 2.5 | Number of Moles of Steam/Number of Moles of Methane |
| Amount of Catalyst | 10 cc | 3 cc | |
| Reaction Temperature (Catalyst Reactor Tube Wall Temperature) | 550° C. | 670° C. | |

TABLE 2

| | Carrier-Modifying Element (Part(s) by Weight) | | | Active Metals (Part(s) by Weight) | | | Rh Composition in Active Metals Ratio (%) | Conversion (%) | Metal Dispersion Degree (%) | Concentration of Ammonia Produced PPM |
|---|---|---|---|---|---|---|---|---|---|---|
| Examples | Ce | La | Y | Rh | Pt | total | | | | |
| Example 1 | 5.0 | 3.0 | 1.5 | 0.15 | 0.2 | 0.35 | 43 | 51.2 | 47.3 | N.D. |
| Example 2 | 5.0 | 3.0 | 1.5 | 0.15 | 0.05 | 0.20 | 75 | 53.0 | 54.6 | N.D. |
| Example 3 | 5.0 | 3.0 | 1.5 | 0.20 | 0.02 | 0.22 | 91 | 52.4 | 54.8 | N.D. |
| Example 4 | 1.5 | 3.0 | 1.5 | 0.15 | 0.20 | 0.35 | 43 | 50.3 | — | N.D. |
| Example 5 | 3.0 | 3.0 | 1.5 | 0.15 | 0.20 | 0.35 | 43 | 49.6 | — | N.D. |
| Example 6 | 5.0 | 3.0 | 1.5 | 0.30 | 0.30 | 0.60 | 50 | 52.0 | 43.2 | N.D. |
| Example 7 | 4.0 | 0 | 0 | 0.10 | 0.15 | 0.25 | 40 | 45.2 | 41.9 | N.D. |
| Example 8 | 4.0 | 0 | 0 | 0.15 | 0.20 | 0.35 | 43 | 46.3 | 45.6 | N.D. |
| Comparative Example 1 | 0 | 3.0 | 2.0 | 0.15 | 0.20 | 0.35 | 43 | 42.9 | — | N.D. |
| Comparative Example 2 | 0 | 0 | 0 | 0.20 | 0 | 0.20 | 100 | — | — | 12 |
| Comparative Example 3 | 0 | 0 | 0 | 0.10 | 0 | 0.10 | 100 | — | — | 7 |
| Comparative Example 4 | 0 | 0 | 0 | 0.08 | 0.12 | 0.20 | 40 | 33.0 | 31.5 | N.D. |
| Comparative Example 5 | 0 | 0 | 0 | 0.15 | 0.25 | 0.40 | 38 | 38.0 | 23.2 | N.D. |

Table 2 also shows metal dispersion degree measured using the carbon monoxide pulse chemisorption method. Metal dispersion degrees were measured in accordance with the method described below. Values of metal dispersion degree were calculated based on [the amount of adsorbed CO (moles)/the amount of the active metals (moles)] (%). Carbon monoxide gas is adsorbed only onto metals, and hence, the dispersion degree is considered to be a measure of the proportion of the active metals exposed on the surface to the total active metals.

The carbon monoxide pulse chemisorption method: a technique for determining the active surface area of a noble metal, by utilizing the property of carbon monoxide to be chemically adsorbed onto the noble metal. This method involves introducing CO-pulses to measure the amount of adsorption. Prior to the measurement, the noble metal is reduced with hydrogen, and, using a TCD (Thermal Conductivity Detector), changes in gas concentration at the sample outlet are measured and integrated to determine the amount of adsorption.

1) The following can be derived from Table 2. The catalysts of Comparative Examples 2 and 3 without Pt supported thereon both generated ammonia. In contrast, none of the catalysts in the examples having Pt supported thereon showed ammonia generation, and, as is seen in Example 3, the generation of ammonia was prevented even with a Pt loading amount as small as 0.02 parts by weight.

2) For Examples 1 to 3 and 6 having equal Ce, La and Y loading amounts, the Pt ratio (Pt loading amount/total amount of the active metals) versus the conversion can be plotted as shown in FIG. 1. This plot shows a tendency for the conversion to increase by approximately 2 to 3% along with a decrease in the amount of Pt added. One reason for this is presumably that along with a decrease in the amount of Pt added, the Rh metal higher in reactivity than Pt emerges more on the surface of the active metal particles to enhance the activity.

3) An observation of the effect of the Rh loading amount on the conversion ratio shows that, although there are some variations in the data, the conversion ratio sharply increases with an increase in the Rh loading amount, and the conversion ratio approaches saturation at a loading amount of around 0.10%, and is virtually saturated at a loading amount near 0.3 to 0.4% (FIG. 2).

4) A comparison between the catalyst sample with Ce supported thereon (Example 1) and the catalyst sample without Ce (Comparative Example 1) shows that the conversion for the catalyst sample having the modification with Ce is 51.2%, whereas the conversion for the catalyst sample of Comparative Example 1 without the modification with Ce is much lower, i.e. 42.9%. This reveals that the modification with Ce significantly improves the conversion.

5) An investigation of the relationship between the Ce loading amount and the conversion shows a tendency for the conversion to sharply increase at a Ce loading amount near 1 part by weight, and the conversion to be saturated at a Ce loading amount of approximately 5 parts by weight (FIG. 3). The Ce loading amount is thus preferably 1 to 10 parts by weight, and is particularly preferably 2 to 6 parts by weight. If the Ce loading amount is less than 1 part by weight, the effect of increasing the activity will be small, and if the Ce loading amount is 10 parts by weight or more, there is a risk of a decrease in stability due to Ce, and the costs will significantly increase as Ce is more expensive than alumina.

6) A plot of conversion versus dispersion degree of the active metals (FIG. 4) shows an overall tendency for the conversion to increase as the metal dispersion degree increases. The effect of the modification with Ce is an extremely important factor for increasing the conversion. Furthermore, the metal dispersion is increased to some extent by adding La and Y in addition to Ce (comparison between Examples 1 and 8). The increase in the conversion attributed to the modification with La and Y is greater than the increase in the dispersion degree attributed to the modification with La and Y, and hence, the modification with La and Y presumably also makes a contribution beyond the dispersion degree (FIG. 4).

7) From the results shown in FIG. 4, the activity of the steam reforming catalyst in which Rh is supported as an active metal on the α-alumina carrier is considered to be primarily determined by the dispersion degree of the Rh alloy, and to achieve a practical conversion, the dispersion degree is considered to be preferably at least 35% or more, more preferably 40% or more, and particularly preferably 50% or more. While the modification with Ce in principle cannot be said to be essential for obtaining such a high dispersion degree, it is preferred to modify the α-alumina carrier with Ce, in view of comprehensive performance such as in terms of carbon deposition.

Example 10

Evaluation of Long-Time Stability

For the catalyst samples of Examples 1 and 2, the long-term stability was evaluated under the test conditions 2 shown in Table 1. The results are shown in Table 3 and illustrated in FIG. 5. To evaluate estimated stability of 10 years, the test was performed by adjusting one of the reaction conditions, S. V. (gas flow rate velocity; space velocity), to 10,000 $h^{-1}$. This is considered to have a rate of acceleration approximately 10 times as high as that under a general reaction condition (1,000 for example).

The following can be derived from Table 3 and FIG. 5.

1) Although the catalyst of Example 1 shows a slight decrease in the conversion from the initial period to approximately 1,000 hours, it becomes very stable in activity thereafter, and maintains 70% of the activity even after 5,000 to 10,000 hours lapsed. The catalyst of Example 2 shows a similar deactivation ratio until 5,000 hours, and is thus found to have a stability comparable to that of Example 1.

2) The catalyst of Example 8 not containing La or Y shows a decrease in activity to 83.1% at 2,215 hours, whereas the catalyst of Example 2 containing La and Y still maintains a higher activity, i.e. 84.1%, even at about 3,400 hours. This shows that La and Y improved the deactivation ratio, that is, increase the long-term stability (Table 3).

3) When the plot shown in FIG. 5 is extended, both the catalysts of Examples 1 and 2 maintain high activities, i.e. 70% or more compared to the initial activity, even after being reacted for 10,000 hours. As described above, because the rate of acceleration in this stability test is expected to be approximately 10-fold, the catalysts are estimated to possess stability as high as 10 years (approximately 90,000 hours) or longer.

4) Furthermore, visual observation of each of the samples of Examples 1 and 2 after a lapse of 6,000 hours in the stability test revealed that the catalyst surface underwent only some change in color, and its whiteness still remained sufficient. Observation of these samples with a microscope at 100× magnification also revealed that although these samples showed slight carbon deposition, they showed no noticeable carbon deposition, and were observed to maintain sufficient activities. Assuming that the rate of acceleration is 10-fold, these samples are estimated to also have stability of 5 years or longer, and close to 10 years, in terms of the evaluation of carbon deposition.

TABLE 3

| Sample: Example 1 | | | Sample: Example 2 | | | Sample: Example 8 | | |
|---|---|---|---|---|---|---|---|---|
| Time (h) | Conversion (%) | Deactivation Ratio (%) | Time (h) | Conversion (%) | Deactivation Ratio (%) | Time (h) | Conversion (%) | Deactivation Ratio (%) |
| 0 | 43.3 | 100 | 0 | 42.1 | 100 | 0 | 39 | 100 |
| 1027 | 37.1 | 86 | 1439 | 36.9 | 87.6 | 2215 | 32.4 | 83.1 |
| 3547 | 35.6 | 82 | 3387 | 35.4 | 84.1 | — | — | — |
| 6068 | 34.8 | 80.4 | 5656 | 33.9 | 80.5 | — | — | — |
| 10034 | 31.4 | 72.5 | — | — | — | — | — | — |

Example 11

X-Ray Diffraction Measurement

To study the mechanism of the effects of La and Y shown in Example 10, the catalyst samples of Examples 1 and 7 were subjected to X-ray diffraction measurement. The X-ray diffraction measurement was performed using an X-ray diffractometer from PANalytical. A glass sample cell was filled with each of the samples, and the measurement was performed by the 2θ-θ reflection method, using Cu-Kα (1.5406 Å) as the X-ray source. Furthermore, samples in which La or Y only was supported on the α-alumina carrier (each used as the sample of Comparative Example 6 or the sample of Comparative Example 7) were prepared, and subjected to the measurement simultaneously (Table 4, FIG. 6). Although the sample of Example 1 (Ce, and La and Y) shows a peak position different from the peak position of the sample of Example 7 (Ce), these samples have a substantially equal half-width. It was therefore understood that in the sample of Example 1, the three components, Ce, La and Y, form a single solid solution, rather than being individually present in separate crystal forms (increase in half-width). Therefore, the effects of La and Y (stability and activity improvements) described above (Example 1) are considered to be largely attributed to the effect of the formation of the solid solution.

TABLE 4

| Sample | Supported Metal(s) | Peak Position of Solid Solution (° 2θ) | Peak Half-Width |
|---|---|---|---|
| Example 1 | Rh, Pt, Ce, La, Y | 28.3 | 1.23° |
| Example 7 | Rh, Pt, Ce | 28.5 | 1.27° |
| Comparative Example 6 | La (8.5%) | 27.7 | 1.15° (2 Peaks) |
| Comparative Example 7 | Y (8%) | 29.2 | 0.77° |

The invention claimed is:

1. A steam reforming catalyst, comprising active metals supported on an α-alumina carrier,
   wherein the active metals comprise 0.1 to 0.3 parts by weight of rhodium (Rh) based on the content of the Rh, relative to 100 parts by weight of the α-alumina carrier, and 0.01 to 0.3 parts by weight of platinum (Pt) based on the content of the Pt, relative to 100 parts by weight of the α-alumina carrier, and
   the α-alumina carrier is a carrier modified with a promoter comprising 1 to 10 parts by weight of cerium (Ce) based on the content of the cerium, relative to 100 parts by weight of the α-alumina carrier, and
   wherein the promoter further comprises 0.6 to 15 parts by weight of a rare-earth element other than Ce based on the content of the rare-earth element, relative to 100 parts by weight of the α-alumina carrier, and
   wherein the rare-earth elements other than Ce comprise lanthanum (La) and yttrium (Y), and the promoter comprises 0.4 to 10 parts by weight of La based on the content of the La, relative to 100 parts by weight of the α-alumina carrier, and 0.2 to 5 parts by weight of Y based on the content of the Y, relative to 100 parts by weight of the α-alumina carrier, and
   wherein said catalyst is for steam reforming of a hydrocarbon-containing gas, the sulfur concentration of which is less than 0.1 ppm.

2. The steam reforming catalyst according to claim 1, wherein a loading amount of Rh comprises 0.10 parts by weight or more and less than 0.3 parts by weight based on the content of the Rh, relative to 100 parts by weight of the α-alumina carrier, and a loading amount of Pt comprises 0.01 parts by weight or more and less than 0.2 parts by weight based on the content of the Pt, relative to 100 parts by weight of the α-alumina carrier.

3. The steam reforming catalyst according to claim 1, comprising a total loading amount of Rh and Pt of 0.11 parts by weight or more and less than 0.3 parts by weight based on the content of the Rh and Pt, relative to 100 parts by weight of the α-alumina carrier.

4. The steam reforming catalyst according to claim 1, wherein the active metals further comprise Ni in an amount less than 1 part by weight based on the content of the Ni, relative to 100 parts by weight of the α-alumina carrier.

5. The steam reforming catalyst according to claim 1, wherein the rare-earth element other than Ce and the Ce form a solid solution on the modified carrier.

6. The steam reforming catalyst according to claim 5, which has a diffraction peak at a position of 2θ=27 to 29.5° in X-ray diffraction measurement.

7. The steam reforming catalyst according to claim 1, further comprising less than 0.1 parts by weight of an alkaline earth metal element based on the content of the alkaline earth metal, relative to 100 parts by weight of the α-alumina carrier.

8. The steam reforming catalyst according to claim 1, which has an active metal dispersion degree of 35% or more, measured using a carbon monoxide pulse chemisorption method.

9. An apparatus for producing hydrogen comprising:
   a super higher-order desulfurizer or an ordinary temperature desulfurizer for removing a sulfur component from a hydrocarbon-containing gas supplied through a supply passage for the hydrocarbon-containing gas; and
   a steam reformer filled with the steam reforming catalyst according to claim 1,
   for reforming the hydrocarbon-containing gas desulfurized by the desulfurizer.

10. A method for producing hydrogen comprising the steps of a) providing a hydrocarbon-containing gas, the sulfur concentration of which is less than 0.1 ppm; and
b) contacting a steam reforming catalyst comprising active metals supported on an α-alumina carrier, wherein the active metals comprise 0.1 to 0.3 parts by weight of rhodium (Rh) based on the content of the metal Rh, relative to 100 parts by weight of the α-alumina carrier, and 0.01 to 0.3 parts by weight of platinum (Pt) based on the content of the metal Pt, relative to 100 parts by weight of the α-alumina carrier, and the α-alumina carrier is a carrier modified with a promoter comprising 1 to 10 parts by weight of cerium (Ce) based on the content of the metal cerium, relative to 100 parts by weight of the α-alumina carrier, and wherein the promoter further comprises 0.6 to 15 parts by weight of a rare-earth element other than Ce based on the content of the rare-earth element, relative to 100 parts by weight of the α-alumina carrier, and wherein the rare-earth elements other than Ce comprise lanthanum (La) and yttrium (Y), and the promoter comprises 0.4 to 10 parts by weight of La based on the content of the La, relative to 100 parts by weight of the α-alumina carrier, and 0.2 to 5 parts by weight of Y based on the content of the Y, relative to 100 parts by weight of the α-alumina carrier, with the hydrocarbon-containing gas and steam.

11. The method for producing hydrogen according to claim 10, wherein the hydrocarbon-containing gas further contains nitrogen.

12. The method for producing hydrogen according to claim 10, wherein, in step b), the steam reforming catalyst is contacted with the hydrocarbon-containing gas and steam in a steam reformer filled with the steam reforming catalyst, and the steam reformer is operated for 1 year or longer cumulatively, without replacing the catalyst.

13. The method for producing hydrogen according to claim 10, wherein the hydrocarbon-containing gas, the sulfur concentration of which is less than 0.1 ppm, is prepared by using a super higher-order desulfurization method or an ordinary temperature desulfurization method.

14. The method for producing hydrogen according to claim 10, wherein a loading amount of Rh in the catalyst comprises 0.10 parts by weight or more and less than 0.3 parts by weight based on the content of the Rh, relative to 100 parts by weight of the α-alumina carrier, and a loading amount of Pt in the catalyst comprises 0.01 parts by weight or more and less than 0.2 parts by weight based on the content of the Pt, relative to 100 parts by weight of the α-alumina carrier.

15. The method for producing hydrogen according to claim 10, wherein the catalyst comprises a total loading amount of Rh and Pt of 0.11 parts by weight or more and less than 0.3 parts by weight based on the content of the Rh and Pt, relative to 100 parts by weight of the α-alumina carrier.

16. The method for producing hydrogen according to claim 10, wherein the rare-earth element other than Ce and the Ce form a solid solution on the modified carrier.

17. The method for producing hydrogen according to claim 10, wherein the catalyst further comprises less than 0.1 parts by weight of an alkaline earth metal element based on the content of the alkaline earth metal, relative to 100 parts by weight of the α-alumina carrier.

18. The method for producing hydrogen according to claim 10, wherein the catalyst has an active metal dispersion degree of 35% or more, measured using a carbon monoxide pulse chemisorption method.

19. The method for producing hydrogen according to claim 10, wherein the catalyst has a diffraction peak at a position of $2\theta=27$ to $29.5°$ in X-ray diffraction measurement.

20. A steam reforming catalyst, comprising active metals supported on an α-alumina carrier,
wherein the active metals comprise 0.1 to 0.3 parts by weight of rhodium (Rh) based on the content of the Rh, relative to 100 parts by weight of the α-alumina carrier, and 0.01 to 0.3 parts by weight of platinum (Pt) based on the content of the Pt, relative to 100 parts by weight of the α-alumina carrier, and
the α-alumina carrier is a carrier modified with a promoter comprising 1 to 10 parts by weight of cerium (Ce) based on the content of the cerium, relative to 100 parts by weight of the α-alumina carrier, and
wherein the active metals further comprise Ni in an amount less than 1 part by weight based on the content of the Ni, relative to 100 parts by weight of the α-alumina carrier, and
wherein said catalyst is for steam reforming of a hydrocarbon-containing gas, the sulfur concentration of which is less than 0.1 ppm.

21. A method for producing hydrogen comprising the steps of
a) providing a hydrocarbon-containing gas, the sulfur concentration of which is less than 0.1 ppm; and
b) contacting a steam reforming catalyst comprising active metals supported on an α-alumina carrier, wherein the active metals comprise 0.1 to 0.3 parts by weight of rhodium (Rh) based on the content of the metal Rh, relative to 100 parts by weight of the α-alumina carrier, and 0.01 to 0.3 parts by weight of platinum (Pt) based on the content of the metal Pt, relative to 100 parts by weight of the α-alumina carrier, and the α-alumina carrier is a carrier modified with a promoter comprising 1 to 10 parts by weight of cerium (Ce) based on the content of the metal cerium, relative to 100 parts by weight of the α-alumina carrier, and wherein the active metals further comprise Ni in an amount less than 1 part by weight based on the content of the Ni, relative to 100 parts by weight of the α-alumina carrier,
with the hydrocarbon-containing gas and steam.

* * * * *